United States Patent Office 3,468,673
Patented Sept. 23, 1969

3,468,673
FRENCH FRIED POTATO MIX MADE FROM DEHYDRATED MASHED POTATOES
Harold M. Keller, St. Paul, Minn., assignor to General Mills, Inc., a corporation of Delaware
No Drawing. Filed May 19, 1966, Ser. No. 551,228
Int. Cl. A23l 1/12
U.S. Cl. 99—100                    5 Claims

ABSTRACT OF THE DISCLOSURE

A product made to resemble French fried potatoes containing dehydrated mashed potato particles, a polygalactomannan and methyl cellulose.

---

The present invention relates to a mix for making French fried potatoes from finely divided dehydrated mashed potatoes, and to a method of making French fried potatoes from this mix.

Originally, French fried potatoes were made by trimming and cutting raw potatoes into strips and then frying the strips in oil. This method is subject to a number of limitations and disadvantages. In the first place, only a portion of the potato is suitable for this purpose. It is necessary to use essentially the central portion of the potato in order to make strips of suitable size. The remainder of the potato may be wasted or used for some less valuable purpose.

Another disadvantage of this method of preparation is the need for peeling and trimming the potatoes at the time that the French fried potatoes are to be prepared. This is time-consuming and delaying during the rush periods. In addition, there is the well-known disadvantage of the loss by spoilage of fresh potatoes during storage.

For these and other reasons, attempts have been made in the past to make French fried potatoes by starting with dehydrated mashed potatoes, making a sort of dough, and extruding the dough into strips suitable for French frying. These efforts have usually involved the inclusion of some sort of binder in with the dehydrated mashed potatoes to hold the strips together and to give them physical semblance of French fried potatoes. These efforts have not been entirely successful. In some instances, there has been a tendency for the extruded strip to shrink or collapse on the interior so that the typical shape of French fried potatoes is not maintained. Some of the binders tend to seal the exterior of the potatoes to such an extent that there is no noticeable penetration of the cooking oil. As a consequence, the cooked product does not have the taste appeal of the typical French fried potatoes. Likewise, some of these products tend to have a glazed appearance which is quite artificial as compared with the typical French fried potatoes made from fresh potatoes.

It has now been discovered that it is possible to produce a French fried potato starting with dehydrated mashed potatoes which has most of the characteristics of the French fried potatoes made from fresh potatoes.

It is, therefore, an object of the present invention to provide a novel French fried potato mix containing dehydrated mashed potatoes and a combination of binders suitable for the production of French fried potatoes having many of the characteristics of French fried potatoes made from fresh potatoes. It is a further object of the present invention to provide a method of preparing French fried potatoes from such a mix.

The mix of the present invention is composed of three essential ingredients: dehydrated mashed potatoes, methyl cellulose, and a polygalactomannan gum. Salt is preferably used as a fourth but optional ingredient.

Any dehydrated mashed potatoes may be used as a starting material. A variety of these are commercially available and others are described in the literature. The products most commonly available commercially are known as potato flakes or potato granules. Because of their ready availability, these two forms of dehydrated mashed potatoes are preferred. However, any dehydrated potato product which may be rehydrated to provide a homogenous mash free from lumps may be used in the present invention.

Methyl cellulose is a methyl ether of cellulose and is available in a variety of commercial forms. A number of commercially available forms of methyl cellulose are sold under the trademark Methocel by the Dow Chemical Company. Some of these are hydroxypropyl substituted and are sold under the designation HG. These are the preferred forms of the commercially available methyl cellulose products.

The polygalactomannan gum which may be used includes any of a variety known by this designation which are composed of polymers of mannose and galactose. Of these gums, locust bean gum and guar gum are both readily available commercially and are preferred for this reason.

As mentioned above, the French fried potato mix is composed of three essential ingredients: dehydrated mashed potatoes, methyl cellulose, and polygalactomannan gum. The gum is employed in the general range of 0.2 to 0.8%, preferably 0.4 to 0.6%, and the methyl cellulose in the range of 0.75 to 2%, preferably 1.0 to 1.5%. The balance of the mix is composed of dehydrated mashed potatoes. The above percentages are based on the total weight of the three components in the mix. As was mentioned above, other optional ingredients may be included in the mix but these do not have any basic effect on the structure of the French fried potatoes. Since it is frequently difficult to get salt to adhere to the surface of the French fried potatoes, it is preferred to include some salt in the mix for internal flavor. The amount employed is a matter of individual taste, but it has generally been found that about 4% salt based on the weight of the mix is suitable.

In preparing the mix, it is simply necessary to intimately mix or blend the ingredients. In preparing the French fried potatoes, the mix is mixed with a suitable amount of water to make a dough. Generally, about 200 parts by weight of water are employed by each 100 parts by weight of the mix. This composition is then mixed sufficiently to get a homogeneous dough which is then placed in an extruder and extruded into strips of any suitable dimensions. Conventionally, the cross-sectional shape is approximately square with side dimensions of from ⅛–⅜ inches. The extruded strips then are cut off by suitable lengths, usually about 2–3 inches, and are fried in hot fat, usually in temperatures of 350 to 400° F. for 1–2 minutes.

The fried product has an appearance both externally and internally quite resemblant to French fried potatoes made from fresh potatoes. There is an external crust on the product which is somewhat irregular and not a smooth artificial glazed surface. The crust has an apparent porosity of some sort which enables it to pick up a modest amount of frying oil sufficient to give the product the typical taste of French fried potatoes. The internal structure of the French fried potatoes is quite uniform and resemblant of the natural product. The combination of the exterior crust and the interior texture of the product give it a physical characteristic quite similar to that of the natural product. The products are not tough but are comparatively crisp and may easily be broken just as the natural product. They have a short breaking characteristic similar to that of the natural product.

The following examples serve to illustrate the invention but are to be considered illustrative only and not as limiting.

EXAMPLE I

A series of mixes were prepared, each containing dehydrated mashed potatoes, a polygalactomannan gum, and a methyl cellulose. Salt was also included for flavoring purposes. The ingredients were combined in the proportions indicated in the following table:

The method of preparing the French fried potatoes is simple, the equipment employed is not particularly expensive, and the product can be made on short notice without a great deal of labor. The product is admirably suited for all production of French fried potatoes but is particularly an advantage for drive-in restaurants and similar short order restaurants where time is essential and where space is frequently at a minimum.

While various modifications of the invention have been described, it is to be understood that the same is not limited thereto but may be varied within the scope of the following claims.

TABLE

| Example No. | Gum | Parts | Methyl cellulose | Parts | Parts dehydrated mashed potatoes | Parts salt |
| --- | --- | --- | --- | --- | --- | --- |
| 1 | Guar | .6 | Methocel 90, HG 15,000 | 1.1 | 94.3 | 4.0 |
| 2 | do | .3 | do | 5.1 | 94.2 | 4.0 |
| 3 | do | .5 | do | .5 | 95.0 | 4.0 |
| 4 | do | .5 | do | 1.5 | 94.0 | 4.0 |
| 5 | do | .3 | Methocel 65, HG 400 | 1.5 | 94.2 | 4.0 |
| 6 | do | .2 | do | 2.0 | 93.8 | 4.0 |
| 7 | Locust bean | .6 | Methocel 90, HG 15,000 | 1.1 | 94.3 | 4.0 |
| 8 | do | .3 | do | 1.5 | 94.2 | 4.0 |

The ingredients were placed in a bowl and blended. The blend was mixed with 200% by weight of tap water and was stirred until the water was uniformly distributed at which time the mixture was relatively fluid. It was allowed to stiffen and set into a relatively firm dough. The dough was then placed in an extruder and extruded through a plate having square holes. The holes had an edge dimension of ¼ inch. The extruded strips were cut off in about 2 inch lengths and were placed in fat at a temperature of about 380 to 390° F. They were fried for from 1 to 2 minutes until the desired degree of browning was obtained. They were then removed from the fat.

All of the products were satisfactory. There were slight differences depending on the particular gums used and the relative amounts thereof. There were slight differences in external appearance, internal appearance, and the amount of oil absorbed. In general, they all consisted of an exterior skin or crust which served to hold the structure together and to prevent undue penetration of the oil. The products were crisp and short in the sense that they could be readily broken with a clean break. The products were not tough or leathery. By means of the variations possible within the scope of the invention, it is possible to adjust the types and amounts of the ingredients to vary the characteristics of the finished product as desired.

While in the above experiments the doughs were extruded directly into the hot fat, it is possible in accordance with the invention to extrude pieces of dough and to set these aside for later frying. If the pieces of extruded dough are pressed together with a fair degree of pressure as, for example, where they are piled up to a considerable height, there is a tendency for the pieces to adhere to some extent. They can be broken apart by simply agitating or shaking the basket when they are immersed in hot oil. It is generally preferred to keep the extruded pieces separate, but if they are in contact the amount of pressure should be low enough so that they will easily separate either prior to or during frying.

It will be seen from the above examples that the composition of the present invention provides a mix suitable for making French fried potatoes quite similar to those made from fresh potatoes. The mix is easily prepared and readily stored without danger of deterioration or loss.

The embodiments of the invention in which an exclusive property or privilege is claimed are defined as follows:

1. A process for the manufacture of French fried potatoes which comprises forming a dough of water, dehydrated mashed potatoes and a binding system consisting essentially of methyl cellulose and a polygalactomannan gum in such proportions that the methyl cellulose is at least equal to the amount of the polygalactomannan gum, the latter two ingredients being present in amounts sufficient to produce a French fry potato product having an irregular, rough surface with said French fried product capable of absorbing oil upon frying, forming said dough into strips and French frying said formed strips.

2. A French fried potato mix comprised of dehydrated mashed potatoes, and a binding system consisting essentially of methyl cellulose and a polygalactomannan gum with the methyl cellulose present in amounts at least equal to the amount of the polygalactomannan gum, the latter two ingredients being present in amounts sufficient to produce a French fry potato product having an irregular, rough surface with said French fried product capable of absorbing oil upon frying.

3. Product according to claim 2 in which the methyl cellulose constitutes from 0.75 to 2% of the mix and the polygalactomannan gum constitutes from .2 to .8% by weight of the mix.

4. A composition according to claim 2 in which the polygalactomannan gum is guar.

5. Product according to claim 2 in which the methyl cellulose constitutes from 1.0 to 1.5% and the gum constitutes from 0.4 to 0.6% by weight of the mix.

References Cited

UNITED STATES PATENTS 3,396,036  8/1968  Liepa _____ 99—100
3,261,695  7/1966  Sienkiewicz et al. _____ 99—207

LIONEL M. SHAPIRO, Primary Examiner

D. M. NAFF, Assistant Examiner

U.S. Cl. X.R.

99—207